(12) United States Patent
Diskin et al.

(10) Patent No.: US 9,326,482 B2
(45) Date of Patent: May 3, 2016

(54) CAT LITTER MAT

(75) Inventors: Aimee Diskin, Napa, CA (US); Sara Paculdo, San Francisco, CA (US)

(73) Assignee: Worldwise, Inc., Novato, CA (US)

( * ) Notice: Subject to any disclaimer, the term of this patent is extended or adjusted under 35 U.S.C. 154(b) by 1025 days.

(21) Appl. No.: 13/046,521

(22) Filed: Mar. 11, 2011

(65) Prior Publication Data

US 2012/0227672 A1  Sep. 13, 2012

(51) Int. Cl.
*A01K 1/015* (2006.01)
*A01K 1/01* (2006.01)

(52) U.S. Cl.
CPC ..................... *A01K 1/0107* (2013.01)

(58) Field of Classification Search
USPC ......... 119/161, 526, 165, 166, 167, 168, 169, 119/170, 458, 471, 479, 28.5, 527; 15/215, 15/216; 5/417; D30/161, 108, 118, 119, D30/120; D32/57; D6/583; D12/203, 221
See application file for complete search history.

(56) References Cited

U.S. PATENT DOCUMENTS

| | | | | |
|---|---|---|---|---|
| 6,357,388 B1 | * | 3/2002 | Holtrop et al. | 119/28.5 |
| 6,386,143 B1 | * | 5/2002 | Link et al. | 119/165 |
| D518,248 S | * | 3/2006 | Northrop | D30/161 |
| D523,192 S | * | 6/2006 | Northrop | D30/161 |
| D550,408 S | * | 9/2007 | Willinger et al. | D30/133 |
| D609,411 S | * | 2/2010 | Crout et al. | D30/161 |
| 8,033,249 B1 | | 10/2011 | Cook et al. | |
| 2002/0156634 A1 | * | 10/2002 | Blum et al. | 704/270 |
| 2004/0200425 A1 | * | 10/2004 | Paquette | 119/165 |

* cited by examiner

*Primary Examiner* — Trinh Nguyen

(74) *Attorney, Agent, or Firm* — Bay Area Technology Law Group PC

(57) ABSTRACT

A cat litter mat and use of the cat litter mat for capturing and disposing of cat litter. The cat litter mat is composed of silicone rubber having a substantially planar central portion and a perimeter, at least a portion of the perimeter having an upturned edge. The cat litter mat is provided with a cat litter box receiving region devoid of the upturned edge, the planar central portion having a plurality of nubs for capturing litter in planar central region of the cat litter mat.

2 Claims, 2 Drawing Sheets

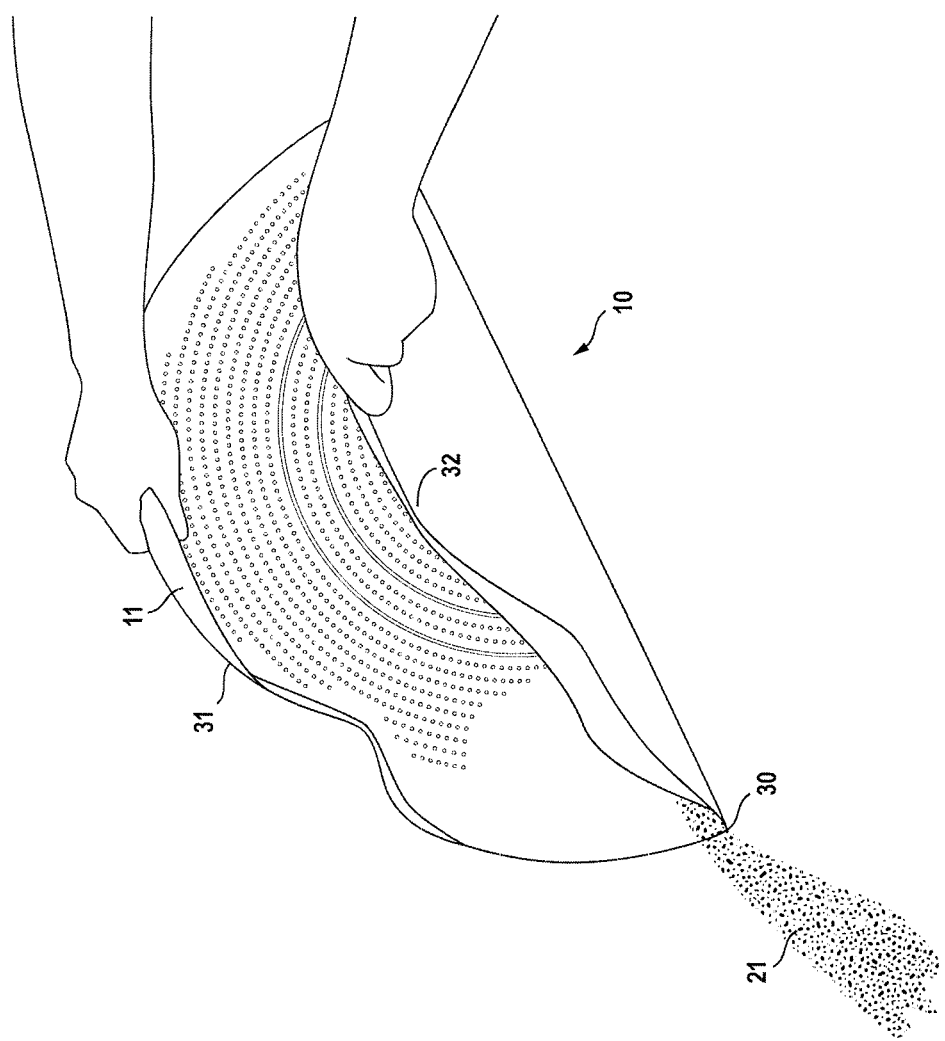

CAT LITTER MAT

TECHNICAL FIELD

The present invention involves a cat litter mat ideally suited for receiving a cat litter box and for capturing cat litter emanating from the box and from the paws of a cat using it. The cat litter mat of the present invention is ideally suited for not only capturing cat litter but also for enabling a user to dispose of it in a manner far superior to products of this type currently available.

BACKGROUND OF THE INVENTION

Litter boxes are owned by virtually all cat owners. Such litter absorbs animal waste and is applied to the litter box as granulated absorbent material. Litter can spill from the box and attach itself to the cat's paws and fur which is then deposited on the floor and furniture in the litter box's immediate vicinity.

Mats are typically used to surround the litter box which are strategically placed as to receive litter from the cat's paws and from the box itself. As noted in U.S. Pat. No. 6,357,388, many prior art mats have short, spike-like projections intended to enter and spread the soft pads on the underside of the cat's paws to allow litter wedged between and on the pads to fall onto the mat before the cat reaches its edge. Recognizing that cats can often times find such projections uncomfortable, the '388 patent suggested producing cat litter mats having paw-engaging projections formed of thermoplastic polyolefin elastomers.

It has now been determined that such projections or nubs can be further made more accepting to a cat by composing them of silicone rubber. Mats made of silicone rubber not only encourage engagement by the cat but, due to its flexibility, enhances litter disposable in a fashion far superior to mats currently in use.

It is thus an object of the present invention to provide a cat litter mat which exhibits the benefits of prior art designs but also is provided with features which improves litter disposal and general maintenance.

These and further objects will be more readily apparent when considering the following disclosure and appended claims.

SUMMARY OF THE INVENTION

A cat litter mat and use of the cat litter mat for capturing and disposing of cat litter. The cat litter mat is composed of silicone rubber having a substantially planar central portion and a perimeter, at least a portion of the perimeter having an upturned edge. The cat litter mat is provided with a cat litter box receiving region devoid of the upturned edge, the planar central portion having a plurality of nubs for capturing litter in planar central region of the cat litter mat.

BRIEF DESCRIPTION OF THE FIGURES

FIG. 3 demonstrates the use of the present invention in disposing of litter captured by the cat litter mat of the present invention.

DETAILED DESCRIPTION OF THE INVENTION

Figure 1:
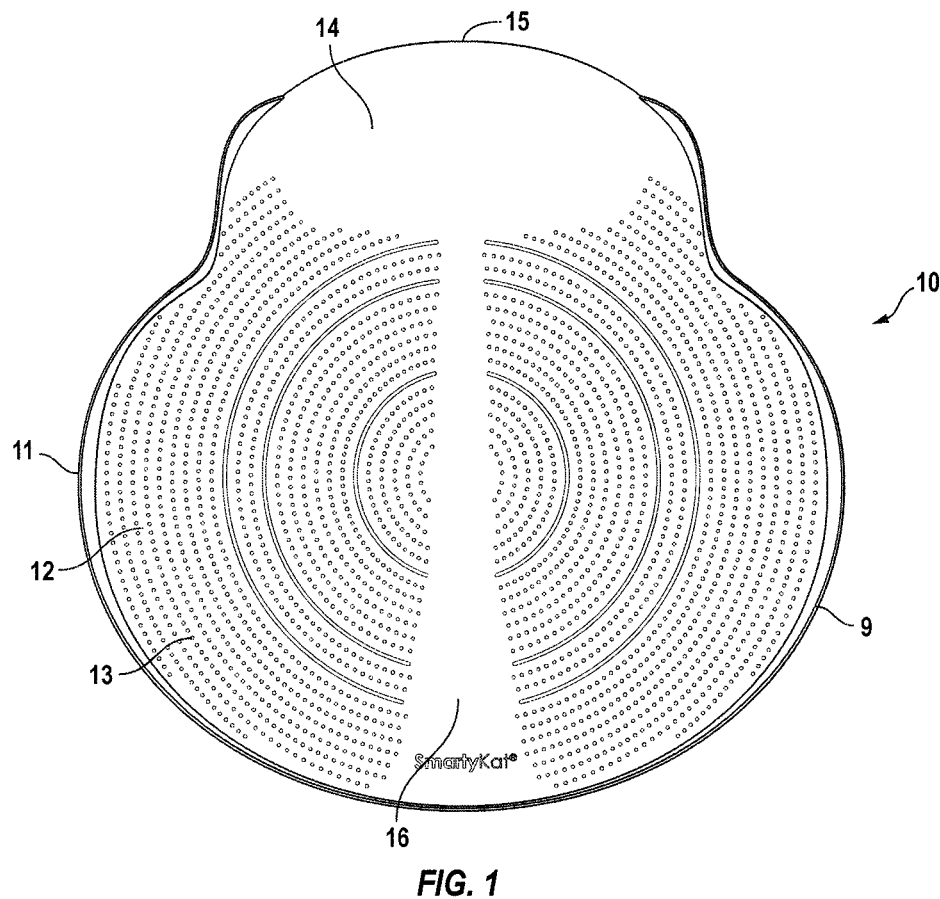
FIG. 1 is a top plan view of the cat litter mat of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

Turning to FIG. 1, cat litter mat 10 is shown. Ideally, cat litter mat 10 is composed of silicone rubber, an extremely pliable and soft material lending itself ideally for use in constructing the present invention.

Cat litter mat 10 includes a substantially planar central portion 12 having a perimeter 9 defining the outer edge of cat litter mat 10.

Planar central portion 12 of mat 10 includes a plurality of nubs 13 also composed of silicone rubber. As was the case with the projections described in U.S. Pat. No. 6,357,388, nubs 13 trap litter spilling from litter box 20 as well as from the paws and fur of a cat noting that nubs 13 enter and spread the soft pads on the underside of the cat's paws. Being of silicone rubber, cats generally find nubs 13 a pleasant surface to walk upon and thus do not avoid planar central portion 12.

Figure 2:
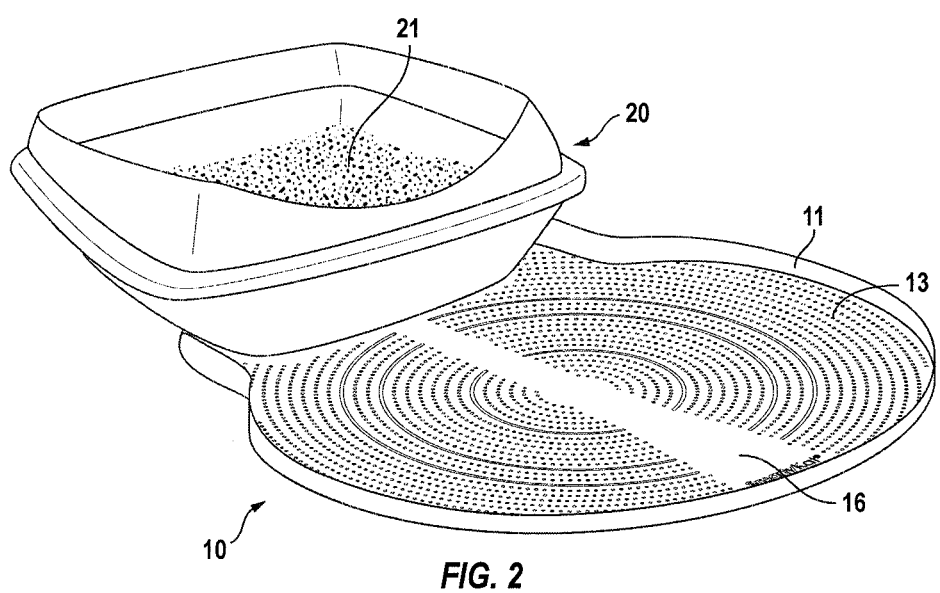
FIG. 2 is a perspective view of the cat litter mat of the present invention supporting a typical cat litter box for use herein.

In turning to FIG. 2, cat litter mat 10 is shown supporting litter box 20 containing commercially available litter 21. Thus, cat litter mat 10 is provided with litter box receiving region 14 which is also devoid of nubs 13 as shown.

In order to confine litter 21 within planar region 12 of cat litter mat 10, upturned edge 11 emanates from perimeter 9 of cat litter mat 10. However, upturned edge 11 generally does not extend to litter box receiving regions 14 to enable litter box 20 to reside as shown in FIG. 2. To maximize its effectiveness, as shown in FIG. 2, upturned edge 11 increases in height as it approaches the cat litter box receiving region.

An important feature of the present invention is its ability to dispose of cat litter 21 as needed. In this regard, reference is made to FIG. 3.

In reference to FIGS. 1 and 2, it is noted that nubs 13 are generally located throughout planar central portion 12 except in a defined area devoid of said nubs. Area 16 devoid of nubs 13 extends from cat litter box receiving region 14 to an opposite edge of central portion 12.

As the cat litter mat 10 of the present invention is composed of soft and pliable silicon rubber, opposite edges 31 and 32 can be grasped as shown in FIG. 3 creating trough 30. Trough 30 extends along area 16 devoid of nubs 13. Thus, as a user grasps edges 31 and 32 of cat litter mat 10 and draws such edges together creating trough 30, cat litter 21 collects within trough 30 and can be easily expressed from cat litter mat 10 along area 16 at shown.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A cat litter mat sized to receive a cat litter box, said cat litter mat composed of silicone rubber having a substantially planar central portion and a perimeter, at least a portion of said perimeter having an upturned edge, a cat litter box receiving region being devoid of said upturned edge, said planar central portion comprising a plurality of nubs extending therefrom and said planar central portion having an area substantially devoid of said nubs, said area devoid of said nubs extending from said cat litter box receiving region to an opposite edge of said central portion.

2. The cat litter mat of claim 1 wherein said upturned edge increases in height as it approaches said cat litter box receiving region.

* * * * *